Patented Mar. 13, 1951

2,545,357

UNITED STATES PATENT OFFICE 2,545,357

DETERGENT COMPOSITION AND METHOD OF PREPARING SAME

David W. Jayne, Jr., Old Greenwich, Conn., assignor to American Cyanamid Company, New York, N. Y., a corporation of Maine No Drawing. Application June 4, 1946, Serial No. 674,384

3 Claims. (Cl. 252—137)

This invention relates to esters of oxy-phosphorous acids, more particularly to esters of oxy-phosphorous acids with amides obtained by condensing carboxylic acids with amino alcohols, and to salts of the oxy-phosphorous acid esters.

In the past, substances having surface activity have been prepared by reacting the condensation product of an alkylol amine and a higher fatty acid with sulfuric acid or a sulfonic acid, as described in Patent No. 2,198,806. Similarly, the phosphoric acid reaction product of the ester obtained by condensing an alkylol amine with a fatty acid has been described in Patent No. 2,173,448 and the phosphoric acid reaction product of a substance obtained by condensing one molecular proportion of a fatty acid with two molecular proportions of an alkylol amine, in Patent No. 2,089,212.

It is an object of the present invention to prepare a substance having surface active properties which make possible its use as a detergent or as a wetting, dispersing, emulsifying, or flotation agent.

A new group of surface active materials constitutes a further object of the present invention.

It is still another object of the present invention to prepare new chemical compounds.

Still another object of the present invention is to prepare a detergent composition.

A further object of the present invention is the preparation of esters which are resistant to hydrolysis and especially to alkali hydrolysis.

These and other objects are attained by reacting an oxy-phosphorous acid with an amide obtained by condensing an amino alcohol in which the amino group is either primary or secondary with a carboxylic acid in substantially equimolar proportions. Salts of the phosphorous acid ester so obtained may be prepared if desired.

The invention will be described in greater detail in conjunction with the following specific examples in which the proportions are given in parts by weight unless otherwise indicated. The details of the following specific examples are merely illustrative and not intended to be restrictive.

Example 1

A mixture of 230 parts (1.1 equivalents) of coconut oil and 70 parts (1.1 equivalents) of monoethanol amine is heated slowly to 160° C. and then allowed to cool to room temperature. A homogeneous soft waxy material which consists of the ethanol amide of coconut oil fatty acids is obtained.

To 120 parts (0.5 equivalent) of the coconut oil fatty acid ethanol amide obtained are added slowly and with agitation 250 parts of 85% phosphoric acid at 70°–80° C. After all of the phosphoric acid is added, the reaction mixture is heated to about 100° C., maintained at that point for about a half-hour, and then cooled to about 25° C. A phosphoric acid ester of the coconut oil fatty acid ethanol amide is obtained.

Example 2

The gelatinous mass obtained after heating the reaction mixture containing phosphoric acid and the coconut oil fatty acid ethanol amide contains a phosphoric acid ester of the amides and free phosphoric acid. The phosphoric acid is neutralized and the solution brought to a pH of 12.0 by the slow addition, with cooling and stirring, of 50% caustic soda solution. The resulting damp, crystalline mush is thoroughly mixed with 200 parts of soda ash and the final product is a dry, white, free-flowing powder consisting of approximately 25% of the sodium salt of an ester of phosphoric acid and the ethanol amide of coconut oil fatty acids, 35% of sodium carbonate and 40% of trisodium phosphate. It dissolves readily in water to give a very "soapy" solution which has excellent detergent properties.

The 50% caustic soda solution may be replaced by any other suitable alkaline material which will produce an alkali metal salt of the ester and of the excess phosphoric acid, i. e., potassium hydroxides, sodium carbonate, sodium bicarbonate, potassium carbonate, potassium bicarbonate, etc. Moreover, ammonium hydroxide, carbonate and bicarbonate may be used as well as organic amines such as the alkyl amines, alkylol amines, etc., but in general these are not as desirable as the metallic compounds although they are perfectly operable.

If a less alkaline detergent composition is desired, the excess phosphoric acid present in the reaction mixture may be neutralized only to the point where disodium phosphate or a similar diester is formed. Such a solution has a pH of about 9.5 and in such cases, the use of sodium or potassium bicarbonate as the neutralizing agent is most desirable.

Any neutral or alkaline salt which will, upon addition to the mixture of ester salt and phosphate, transform said mixture into a dry free-flowing powder may be substituted for the soda ash of Example 2. Included among these salts are potash, sodium sulfate, potassium sulfate, borax, sodium nitrate, potassium nitrate, etc.

The present invention is not limited to the use of coconut oil fatty acid amides. In their place it is possible to use amides of stearic, palmitic, oleic, linoleic, lauric, myristic, ricinoleic, montanic, and melissic acids, wax fatty acids such as those obtained from beeswax and carnauba wax, naphthenic acids, talloel acids, fatty acids obtained from oils such as corn oil, cottonseed oil, soya bean oil, etc. Other fatty acid amides such as those of n-caproic, n-heptoic, caprylic, n-nonylic, capric, undecylic, etc., branched chain isomers of these and other fatty acid amides, and substitution products thereof may also be used. In general, amides of fatty acids which contain at least six carbon atoms in the acid portion of the compound are suitable, the preferred range being from about six to about eighteen carbon atoms. Mixtures of more than one acid may, of course, be used in the preparation of the amides which are intermediate to the products of the present invention.

The amino portion of the foregoing amides must be derived from an amino alcohol having a primary or a secondary amino group. Some amino alcohols which are suitable include alkylol amines such as ethanolamine, diethanolamine, butanolamine, dibutanolamine, pentanolamine, dipentanolamine, hexanolamine, dihexanolamine, isobutanolamine, di-isobutanolamine, laurylolamine, dilaurylolamine, etc., branched chain isomers thereof, homologues thereof and substitution products thereof. Monoalkyl monoalkylolamines such as monoethyl ethanolamine, monoaryl monoalkylolamines such as N-phenyl ethanolamine, and monoaralkyl monoalkylolamines such as N-benzyl ethanolamine may, for instance, be used. It is preferable that the amino alcohols be primary or secondary alcohols because of the greater ease of esterification of these compounds with phosphorous acids. However, tertiary alcohols may be used if they can be esterified by the acid. Moreover, mixtures of different amino alcohols can be used to prepare the fatty acid amides.

The invention is not limited to esters of orthophosphoric acid and it includes esters of metaphosphoric acid and of pyrophosphoric acid as well as those of any other oxygen phosphorous acid such as, for example, phosphorous acid.

Any metallic salt of the phosphorous acid ester may be prepared although the alkali and alkaline earth metal salts are especially useful. Similarly, ammonium and organic amine salts of the esters of the present invention find useful application as surface active materials.

The esters of the present invention are surface active materials which find wide application as wetting, dispersing, emulsifying and flotation agents. Ammonium, organic amine and the alkali metal salts of these esters may also be used for the same purposes.

The esters of the present invention may be used very effectively in detergent mixtures, for example, in mixtures of the esters or salts thereof with an alkaline or neutral salt and a phosphate. Such a detergent mixture may be conveniently prepared as set forth in Example 2 by using an excess of phosphoric acid in the esterification reaction, neutralizing the excess acid with caustic soda, sodium carbonate, potassium bicarbonate, potash, an organic amine, an ammonium salt of a weak acid, or other alkali to produce phosphate in situ, and adding a salt thereto.

In a detergent mixture such as that described in the preceding paragraph and in Example 2, the proportion of the salt of the oxy-phosphorous acid ester of amide to the phosphate is preferably about 1:1.6 by weight but may vary from about 1:1 to about 1:2.5. The particular quantity of neutral or alkaline salt added depends upon the salt in question and the composition of the detergent mixture up to that point; enough is added to produce a dry, free-flowing powder.

I claim:

1. A detergent composition comprising a member of the group consisting of the alkali metal and ammonium salts of an ester of phosphoric acid and an amide obtained by condensation of a fatty acid having from about 6 to about 18 carbon atoms with a member of the group consisting of primary- and secondary-amino alcohols in a 1:1 molar ratio, a member of the group consisting of di and tri valent alkali metal and ammonium phosphates, and a sufficient amount of a member of the group consisting of alkali metal carbonates, alkali metal sulphates, alkali metal nitrates and borax to produce a dry, free-flowing powder, the proportion by weight of said salt of said ester of phosphoric acid and amide to phosphate being from about 1:1 to 1:2.5.

2. A detergent composition according to claim 1 in which the alkali metal is sodium.

3. A detergent composition comprising the sodium salt of an ester of phosphoric acid and an amide obtained by condensation of a fatty acid having from about six to eighteen carbon atoms with a member of the group consisting of primary- and secondary-amino alcohols in a 1:1 molar ratio, trisodium phosphate and a sufficient amount of soda ash to produce a dry, free-flowing powder, the proportion by weight of said sodium salt to said sodium phosphate being from about 1:1 to 1:2.5.

DAVID W. JAYNE, Jr.

REFERENCES CITED

The following references are of record in the file of this patent:

UNITED STATES PATENTS

| Number | Name | Date |
|---|---|---|
| Re. 21,530 | Kritchevsky | Aug. 13, 1940 |
| 1,981,792 | Orelup | Nov. 20, 1934 |
| 1,999,629 | Friesenhahn | Apr. 30, 1935 |
| 2,089,212 | Kritchevsky | Aug. 10, 1937 |
| 2,134,346 | Siefert | Oct. 25, 1938 |
| 2,151,241 | Somner et al. | Oct. 31, 1939 |
| 2,154,977 | Furness et al. | Apr. 18, 1939 |
| 2,177,650 | Harris | Oct. 31, 1939 |
| 2,178,174 | Katzman et al. | Oct. 31, 1939 |
| 2,383,737 | Richardson | Aug. 28, 1945 |
| 2,421,707 | Malkemus | June 3, 1947 |